Feb. 3. 1925.
B. F. SEYMOUR
1,525,327
COMBINED RESILIENT BEARING AND TRANSMISSION
Filed Dec. 3, 1919    2 Sheets-Sheet 1
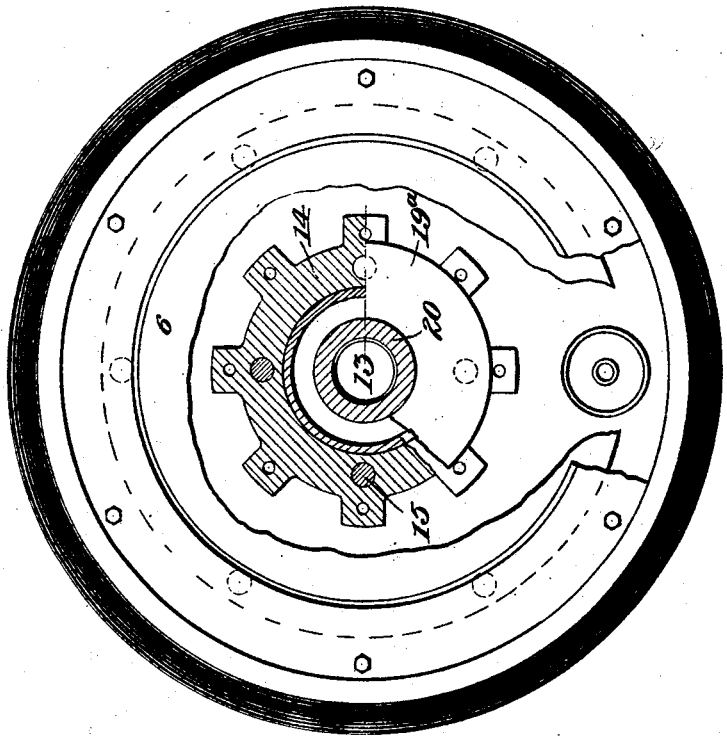
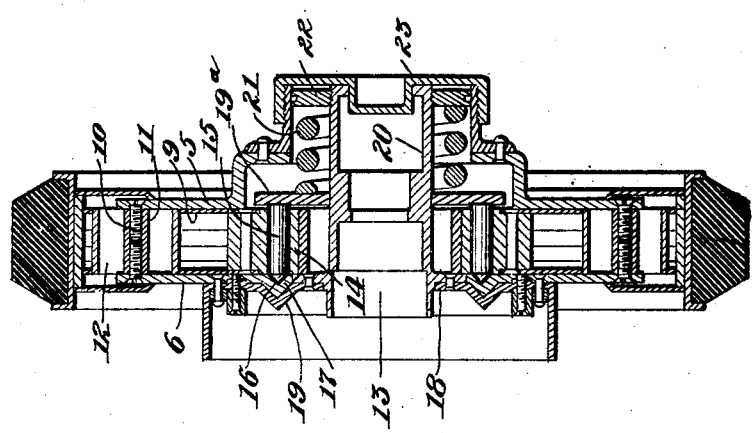
Inventor:
B. F. Seymour,
by ...
Atty.

Feb. 3. 1925.   1,525,327
B. F. SEYMOUR
COMBINED RESILIENT BEARING AND TRANSMISSION
Filed Dec. 3, 1919   2 Sheets-Sheet 2
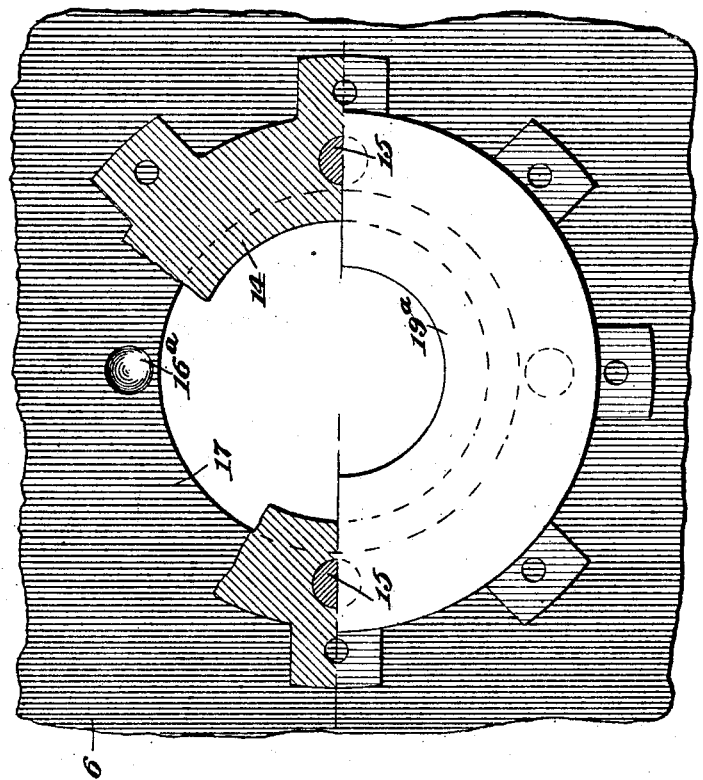
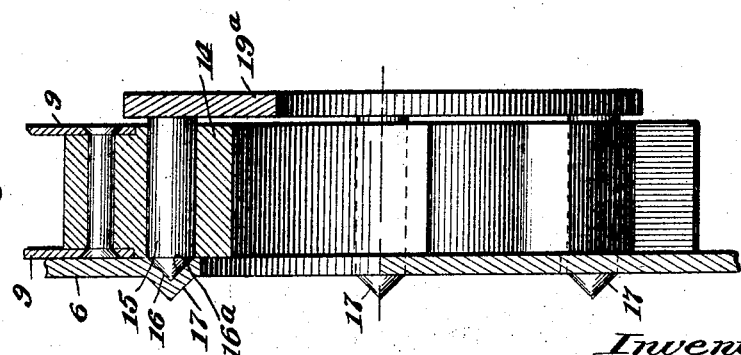
Inventor:
B. F. Seymour, Patented Feb. 3, 1925.

1,525,327

UNITED STATES PATENT OFFICE.

BENJAMIN F. SEYMOUR, OF WASHINGTON, DISTRICT OF COLUMBIA.

COMBINED RESILIENT BEARING AND TRANSMISSION.

Application filed December 3, 1919. Serial No. 342,284.

*To all whom it may concern:*

Be it known that I, BENJAMIN F. SEYMOUR, a citizen of the United States, residing at Washington, in the District of Columbia, have invented certain new and useful Improvements in Combined Resilient Bearings and Transmissions; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter decribed and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The construction shown herein is proposed as an improvement or other embodiment of the types of combined resilient transmission and bearing disclosed in my U. S. Patent No. 1,474,122 dated Nov. 13, 1923; No. 1,477,911 dated Dec. 18, 1923; No. 1,462,384 dated July 17, 1923; No. 1,437,452 dated Dec. 5, 1922; and No. 1,462,385 dated July 17, 1923.

The arrangement shown herein is further characterized in that uniformly distributed and co-operable cone elements are provided for the driving and driven element to the end of obtaining equal and uniformly distributed pressure under all working conditions, whereby to obtain maximum efficiency and ease of operation.

The invention is shown by way of illustration in the accompanying drawings wherein—

Figure 1 is a central sectional view showing the application of the device to a vehicle wheel, Figure 2, a side elevational view thereof, partly in section, Figure 3, an enlarged detail view, partly in section of the transmitting and bearing elements per se, and Figure 4 is a similar view thereof taken at right angles to Figure 3.

Referring to the construction in further detail and wherein like reference characters designate corresponding parts, the construction consists of a hub portion 20 formed with two side plates, or housing members, 5 and 6 which are disposed against the inner and movable rim portion 9 of the wheel, as shown. The two side plates 5 and 6 are secured together by the series of pairs of bolts 10 screwed into threaded sleeves 11 that serve as spacing elements and which are located within the recesses, or openings, 12, as indicated in Figures 1 and 2. It will be understood, of course, that said openings 12 are provided to allow the inner rim portion 9 to have limited radial movements with respect to the slide plates 5 and 6 and the axis 13 of the wheel.

The resilient transmission and bearing device per se consists of an inner or central rim portion 14 secured to the rim part 9 and provided with a plurality of annularly arranged and cylindrical shaped apertures that receive therein the several pins or bolts 15 whose inner ends 16 are cone-shaped and enter complementary formed recesses 16ª on the central portion 17 of the side plate 6 as shown. A reinforcing plate 18 is secured to said plate portion 17 and is formed with cone-shaped recesses 19 immediately overlying the corresponding recesses of the plate 17.

A collar or disk 19ª axially freely movable on the hub portion 20 is held in close contact with the several pins 15 of the rim part 14 by the spring 21, and through the tension of this spring said cone elements (16 and 17) are held in proper co-operative relation.

An adjustable collar 22, screw threaded on the hub portion 20, serves for regulating the tension on said spring and the removable closure plate 23 readily permits of access for adjusting said collar 22 as will be understood.

It will therefore be seen from the foregoing that any motion or shock of the shaft or axle will transmit a like movement to the wheel hub through the medium of the co-acting cones, and that such transmission will be flexible or resilient in nature. And it will be further seen that any jarring motion imparted to the wheel will be resiliently taken up by the co-operating cone elements together with the spring.

It is obvious that those skilled in the art may vary the details of construction and arrangement of parts without departing from the spirit of my invention, and therefore I do not wish to be limited to such features except as may be required by the claims.

Having thus described my invention, what I claim as new is:

1. In a combined resilient transmission and bearing for vehicle wheels the combination of a hub portion, a wheel rim portion mounted to have limited radial movement therein, a plurality of rigid members having wedge elements carried by the inner rim portion and axially movable therein, wedge elements on the hub portion co-operable with said rim wedge elements, and resilient means normally holding said wedge elements in co-operative relation, substantially as set forth.

2. In a combined resilient transmission and bearing for vehicle wheels the combination of a hub portion, a wheel rim portion mounted to have limited radial movement therein, a plurality of rigid members carried by and axially movable in the inner rim portion, said members provided respectively with cone-shaped ends; cone elements formed on the hub portion and co-operable with the cone ends of said axially movable members, and resilient means normally holding said cone elements in co-operative relation, substantially as set forth.

3. In a combined resilient transmission and bearing for vehicle wheels the combination of a hub portion having side plates, a wheel rim portion mounted to have limited radial movement between the side plates, a plurality of axially movable and rigid members carried wholly by the inner rim portion, each of said movable members having a cone-shaped end; cone elements formed on one of the side plates and co-operable with the cone ends of said movable members, and resilient means normally holding said cone elements in co-operative relation, substantially as set forth.

4. In a combined resilient transmission and bearing for vehicle wheels the combination of a hub portion having side plates, a wheel rim portion mounted to have limited radial movement between the side plates, a plurality of axially movable and rigid members carried wholly by the inner rim portion, each of said movable members having a cone-shaped end; cone elements formed on one of the side plates and co-operable with the cone ends of said movable members, a collar disposed against the opposite ends of said axially movable members, and a spring engaging said collar to hold the cone elements in co-operative relation, substantially as set forth.

In testimony whereof I affix my signature.

BENJAMIN F. SEYMOUR.